(12) United States Patent
Schmitt

(10) Patent No.: US 6,604,026 B2
(45) Date of Patent: Aug. 5, 2003

(54) METHOD AND SYSTEM FOR RECOGNIZING DRIVING-DYNAMIC STATES OF A VEHICLE

(75) Inventor: Hubert Schmitt, Ochtendung (DE)

(73) Assignee: Lucas Varity GmbH (DE)

(*) Notice: Subject to any disclaimer, the term of this patent is extended or adjusted under 35 U.S.C. 154(b) by 0 days.

(21) Appl. No.: 10/133,247

(22) Filed: Apr. 25, 2002

(65) Prior Publication Data

US 2003/0004614 A1 Jan. 2, 2003

Related U.S. Application Data

(63) Continuation of application No. PCT/EP00/10179, filed on Oct. 16, 2000.

(30) Foreign Application Priority Data

Oct. 25, 1999 (DE) .......................................... 199 51 274

(51) Int. Cl.$^7$ ................................................ G06F 7/00
(52) U.S. Cl. ............................ 701/1; 701/69; 73/146; 73/146.2; 200/61.22; 340/442
(58) Field of Search .............................. 701/1, 7, 8, 69; 73/146, 146.2, 146.4, 146.8; 200/61.22; 340/442, 445

(56) References Cited

U.S. PATENT DOCUMENTS

| | | | |
|---|---|---|---|
| 4,909,074 A | * | 3/1990 | Gerresheim et al. ....... 73/146.4 |
| 5,297,424 A | | 3/1994 | Sackett |
| 5,828,975 A | | 10/1998 | Isshiki et al. |
| 5,965,808 A | * | 10/1999 | Normann et al. .......... 73/146.5 |

FOREIGN PATENT DOCUMENTS

| | | |
|---|---|---|
| DE | 4106848 | 9/1991 |
| DE | 4014561 | 11/1991 |
| DE | 19744611 | 4/1999 |
| EP | 481043 | 9/1994 |
| EP | 712740 | 5/1996 |

OTHER PUBLICATIONS

Document Bibliography and Abstract for DE4014561 from the esp@cenet database, http://12.espacenet.com/espacenet/viewer?PN=EP0481043&CY=ep&LG=en&DB=EPD, printed Apr. 24, 2002.

Document Bibliography and Abstract for DE4106848 from the esp@cenet database, http://12.espacenet.com/espacenet/viewer?PN=DE4106848&CY=ep&LG=en&DB=EPD, printed Apr. 18, 2002.

* cited by examiner

*Primary Examiner*—Gertrude Arthur
(74) *Attorney, Agent, or Firm*—MacMillan, Sobanski & Todd, LLC

(57) ABSTRACT

A method and a system for recongnizing both a driving-dynamic state of a vehicle and a surface quality of the carriageway of which the vehicle is moving. The pressures of the tires of the vehicle are measured and evaluated so that conclusions can be draw on both current driving-dynamic states and existing surface qualities of the carriageway.

23 Claims, 2 Drawing Sheets

METHOD AND SYSTEM FOR RECOGNIZING DRIVING-DYNAMIC STATES OF A VEHICLE

CROSS REFERENCE TO RELATED APPLICATIONS

This application is a continuation of International Application No. PCT/EP00/10179 filed Oct. 16, 2000, which claims priority to German Patent Application No. 19951274.4 filed Oct. 25, 1999, the disclosures of which are incorporated herein by reference.

BACKGROUND OF THE INVENTION

The present invention concerns a method and a system for recognizing driving-dynamic states of a vehicle, in particular, signals, which indicate the variations of the tire pressures of tires of a vehicle being used for the purpose of recognizing critical driving-dynamic states.

So-called vehicle stability controllers are used in vehicles, and particularly in passenger cars, for the purpose of recognizing driving-dynamic states of the vehicle which can result in critical situations (skidding, oversteer and understeer, locking of the wheels, . . . ) in the driving operation of the vehicle and for the purpose of controlling individual components of the vehicle, which can influence the driving-dynamic state of the vehicle, in such a way that a critical driving-dynamic state is changed into a non-critical driving-dynamic state, i.e., the vehicle is stabilized. Examples of such vehicle stability controllers are anti-lock braking systems, electronic stability programs (ESP), anti-skid controllers, devices for limiting the engine torque and the engine rotational speed, and devices for chassis damping. In order to recognize a driving-dynamic state of the vehicle, vehicle stability controllers use various sensors to measure parameters of the vehicle which, immediately or following an evaluation, enable conclusions to be drawn on the driving-dynamic state of the vehicle. They measure, for example, the braking force acting on the individual wheels, the accelerator pedal position or the supply of fuel to the engine, the engine rotational speed, the engine torque, the rotational speed of the individual wheels, the acceleration or retardation of the vehicle in the driving direction and in directions across the latter, the loading of the vehicle, etc. In addition, external parameters which enable conclusions to be drawn on, for example, the weather conditions (temperature, rain, snow, . . . ) or the distance from other vehicles can also be measured for the purpose of better recognizing and better correcting, together with the vehicle parameters, critical driving-dynamic states of the vehicle. If a critical driving-dynamic state has been recognized, individual, or several, devices of the vehicle which can influence the driving state of the vehicle are controlled, in dependence on the measured parameters, in such a way that the critical driving-dynamic state is corrected, or the vehicle is stabilized, i.e., in such a way that the vehicle is brought out of the critical driving-dynamic state into a non-critical, stabilized driving-dynamic state. The devices which influence the driving state of the vehicle include, inter alia, devices for controlling the braking force of the individual wheels, the engine rotational speed, the engine torque and the fuel supply.

Since, in critical driving-dynamic states, the influence of vehicle stability controllers is exerted, to a substantial degree, automatically, i.e., without involvement of the vehicle driver, evaluation of the currently driving-dynamic state must be performed with extreme care. This necessitates the measurement and evaluation of a large number of parameters or of particularly indicative parameters which permit a description of the driving-dynamic state. Different sensors, some of complex construction, which are mounted at different locations in the vehicle are normally used for this purpose. Furthermore, additional sensors or devices are used to monitor the operation of the sensors for the vehicle stability controllers or their operation.

Consequently, conventional vehicle stability controllers, and vehicle stability systems comprising the same, are of a very complex construction and require a complex control system in order to assure faultless operation. In addition, the fitting, maintenance and repair of such vehicle stability controllers/systems is rendered difficult due to the large number of different components mounted at different locations in the vehicle.

To overcome these problems, it is an object of the present invention to provide a method, and a system, which recognizes the driving-dynamic, in particular, critical driving-dynamic states of a vehicle, the number of necessary sensors and the complexity of the arrangement/control of the latter being reduced. In addition, the number of necessary vehicle parameters to be measured for the recognition of a driving-dynamic state is to be reduced.

SUMMARY OF THE INVENTION

The invention is based on the phenomenon whereby the wheel loads of the individual wheels vary in dependence on driving-dynamic states, resulting in a dynamic variation of the wheel circumferences, more precisely, of the circumferences of the tires of the individual wheels. These tire circumferential variations result in a variation of the internal volume of the tires and, consequently, in a variation of the pressure in the individual tires. These pressure variations of the individual tires are measured and, according to the invention, compared and evaluated in order to draw conclusions on a driving-dynamic state of the vehicle and, in particular, to recognize a critical driving-dynamic state of the vehicle.

For this purpose, in the case of the method, according to the invention, for recognizing driving-dynamic states of a vehicle, respectively one reference pressure is isochronously measured for each of at least two tires of the vehicle. Respectively one current pressure is then isochronously measured for each of the at least two tires and compared, respectively, with the corresponding reference pressure for the purpose of determining a variation of the pressure of each of the at least two tires. The pressure variations of the at least two tires are then compared with each other. The determined pressure variations of the at least two tires and the result of the comparison of the pressure variations of the individual tires with each other are evaluated in order to generate vehicle information which indicates the driving-dynamic state of the vehicle and, in particular, enables conclusions to be drawn on whether the recognized driving-dynamic state is a critical driving-dynamic state.

The reference pressures of the at least two tires can be measured for a predefined driving-dynamic state and/or on a carriageway with a predefined surface quality.

An improved recognition of driving-dynamic states of the vehicle can be achieved if the isochronous measurement of the current pressures for the at least two tires is performed continuously, i.e., during the entire driving operation of the vehicle, or repeatedly at determined instants, the time interval of which is preferably varied in dependence on other vehicle parameters, or continuously during a predetermined interval of time, the length of which is preferably determined by other vehicle parameters, or repeatedly, at predetermined instants for a predetermined interval of time, other vehicle parameters preferably being taken into account in this case likewise.

In order to determine a temporal course of the pressure variations of an individual tire, at least two pressure variations of a tire occurring in temporal succession are compared.

Similarly, a temporal course of the pressure variations of the at least two tires can be determined by comparing with each other the pressure variations of the at least two tires for at least two pressure variations occurring in temporal succession.

The temporal course of the pressure variations of a tire can also be evaluated for at least one tire.

Likewise possible is an evaluation of at least two comparisons of the isochronously occurring pressure variations of the at least two tires for temporally successive instants at which isochronously occurring pressure variations were measured.

It is also preferable for the temporal course of the pressure variations of the at least two tires to be evaluated for at least two pressure variations occurring in temporal succession.

Using one or more of these evaluations of the pressure variations, it is possible to generate driving state information which better represents the driving-dynamic state of the vehicle.

Furthermore, provision is made for the generation of carriageway information which indicates the surface quality of the carriageway on which the vehicle is moving. According to the invention, the carriageway information is generated by comparison of the temporal course of the pressure variations of at least one of the at least two tires.

In addition, it is possible to generate the carriageway information by additionally evaluating the comparison of the temporal course of the pressure variations of the at least two tires with one another.

In order to stabilize the vehicle in dependence on its known driving-dynamic state, the driving state information and/or the carriageway information is used to control devices of the vehicle which stabilize the driving-dynamic state of the vehicle when a critical driving-dynamic state has been recognized.

In addition, the driving state information and/or the carriageway information can be used to control (calibrate, monitor, activate, deactivate, . . . ) further sensors which are mounted in the vehicle for the purpose of recognizing driving-dynamic parameters.

An object of the invention is also achieved by a system for recognizing driving-dynamic states of a vehicle, the system according to the invention being operated using the above-mentioned method according to the invention.

The invention provides a system which includes pressure sensors which are arranged for the purpose of measuring the pressure of at least two tires of the vehicle, and a processor unit which is connected to the pressure sensors and receives and evaluates signals from the pressure sensors which respectively indicate the pressures measured by the corresponding sensor, there being provided driving state signals, generated by the processor unit, which indicate a driving-dynamic state of the vehicle on the basis of the signals of the pressure sensors.

The system can also include at least one driving stability controller, connected to the processor unit, which serves to stabilize the driving-dynamic state of the vehicle and receives the driving state signals for this purpose.

In addition, it is possible to use a control unit which is connected between the processor unit and the at least one driving stability controller, and at least one driving state sensor which is connected to the control unit.

The control unit preferably generates control signals, for the at least one driving stability controller, which are based on the driving state signals and/or signals from the at lest one driving state sensor.

In order to generate driving state signals which better represent the driving-dynamic state of the vehicle, the processor unit is connected to the at least one driving state sensor in order to obtain signals from the at least one driving state sensor for generating the driving state signals.

Preferred embodiments of the invention are described in the following with reference to the appended figures.

DETAILED DESCRIPTION OF THE INVENTION

Figure 1:
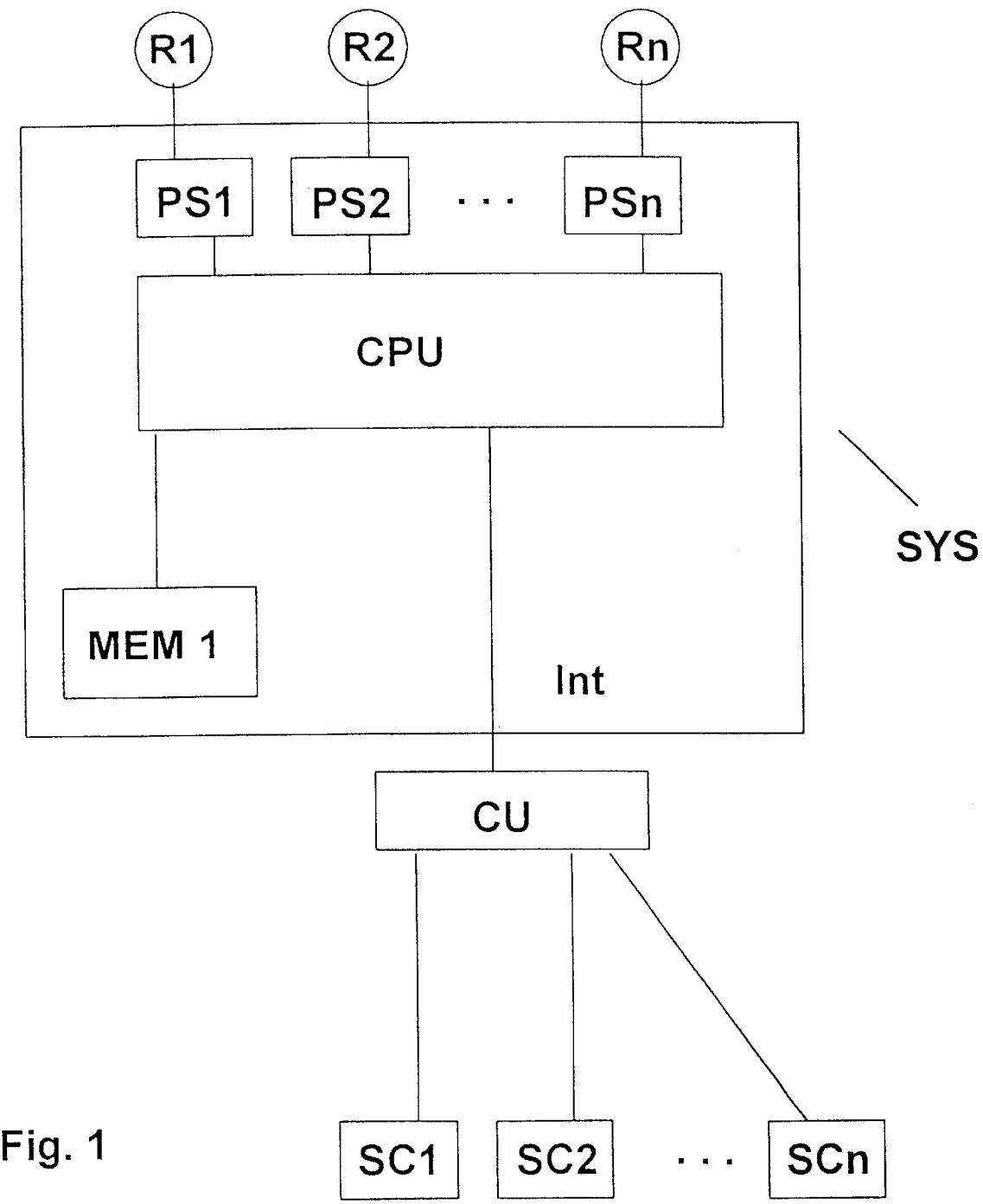
FIG. 1 shows an embodiment of the system according to the invention.

As shown in FIG. 1, the system SYS for recognizing driving-dynamic states of a vehicle comprises pressure sensors PS1, . . . , PSn, which are each respectively connected to a tire R1, . . . , Rn of the vehicle (not shown). It may be expedient, in this connection, to use more than one pressure sensor for each tire, in order to provide a redundant pressure sensor arrangement for each tire. This is particularly preferable when pressure sensors are used which are mounted on the rims of the tires and surrounded by the corresponding tires, or mounted on the insides of the tires, or integrated into the tires or valves. In these cases, replacement or removal of a tire can be avoided in the event of a defect of a first pressure sensor of the redundant pressure sensor arrangement.

The pressure sensors PS1, . . . , PSn are connected to a processor unit CPU for the purpose of bidirectional data exchange. The connections between the pressure sensors PS1, . . . , PSn and the processor unit CPU can be designed in the form of connections for the transmission of electrical, optical and/or electromagnetic signals. In addition, the connections can comprise devices which serve as an interface between the pressure sensors PS1, . . . , PSn and the processor unit CPU, which perform data processing (signal processing) necessary for the transmission of data, and/or independently and/or under the control of the processor unit CPU, control the data transmission according to a data transmission protocol.

The processor unit CPU controls and monitors the operation of the system SYS for recognizing driving-dynamic states of the vehicle, individual and/or several control and monitoring functions being transmittable to individual components of the system SYS for execution by the same.

The processor unit CPU is connected to a memory unit MEM1 via a bidirectional connection for the purpose of data exchange. Like the connection, described above, between the pressure sensors PS1, . . . , PSn and the processor unit CPU, this connection can be designed in various ways. The memory unit MEM1 serves to store data which is output by the processor unit CPU, the data stored in the memory unit MEM1 being read out, in the case of the embodiment of the invention described here, by the processor unit CPU. Alternatively, or additionally, it is possible to make the data of the memory unit MEM1 available to other data-processing units (not shown).

The processor unit CPU additionally comprises a bidirectional interface INT1 for exchanging data bidirectionally with other devices of the vehicle. In the case of the embodiment example of the invention shown here, the processor unit CPU is connected, via the bidirectional interface INT1, to a control unit CU which, in turn, is connected to sensor control devices SC1, . . . , SCn. In this case, the control unit CU controls the sensor control devices SC1, . . . , SCn, in response to data from the processor unit CPU, in such a way that a driving-dynamic state of the vehicle can be controlled/stabilized, if necessary, by means of devices (not shown) which are connected to the sensor control devices SC1, . . . , SCn. Alternatively, or additionally, however, it is possible to connect to the processor unit CPU for the purpose of data exchange each device of the vehicle which requires data received by the processor unit CPU and/or whose operation/performance can be improved by means of this data and/or which are used for controlling the processor unit CPU.

The system SYS for recognizing driving-dynamic states is explained in the following with reference to the embodiment example shown in FIG. 1. It is assumed in this case that the system SYS is used in a vehicle with four wheels, each of which has one tire R1, . . . , R4 each having one respectively assigned pressure sensor PS1, . . . , PS4. If the system SYS is used in a vehicle with more or fewer than four wheels (e.g. lorry, bicycle) and/or with more than one tire per wheel (twin tires) and/or in the case of redundant pressure sensor arrangements for one or more tires (see above), more pressure sensors are to be used accordingly.

The processor unit CPU is activated, by means of a signal (not indicated) supplied to the processor unit CPU, upon startup of the vehicle or in dependence on predetermined operating parameters (e.g. driving-dynamic states) of the vehicle.

The pressure sensors PS1, . . . , PS4 are located at the corresponding tires R1, . . . , R4 in such a way that they measure the respective current pressure of the corresponding tire. The pressure sensors can be located at the wheels or tires in any manner, provided that it is assured that the pressure sensors PS1, . . . , PS4 measure the corresponding tire pressure.

The pressure sensors PS1, . . . , PS4 are preferably activated under the control of the processor unit CPU. Alternatively, it is possible for the pressure sensors PS1, . . . , P4 to be activated independently of the processor unit CPU, for example, upon startup of the vehicle or in dependence on operating parameters of the vehicle which can differ from the operating parameters which can be used for activating the processor unit CPU.

Following a possibly necessary calibration, which can be performed by the pressure sensors PS1, . . . , PS4 independently or under the control of the processor unit CPU, the pressure sensors PS1, . . . , PS4 transmit data to the processor unit CPU which represents the current tire pressure of the corresponding tires R1, . . . , R4. This data transmission from the pressure sensors PS1, . . . , PS4 to the processor unit CPU is preferably controlled by the processor unit CPU. It is also possible, however, for the pressure sensors PS1, . . . , PS4 themselves to control the transmission of the data indicating the tire pressure, following an activation of the processor unit CPU.

The accuracy with which the pressure sensors PS1, . . . , PS4 measure the corresponding tire pressures is determined, in dependence on the particular application of the system SYS, by the processor unit CPU, and/or the measurement resolution of the pressure sensors PS1, . . . PS4. In addition, the temporal sequence of the pressure measurement of individuals of the pressure sensors PS1, . . . , PS4 and the temporal sequence of the pressure measurements of the individual pressure sensors PS1, . . . , PS4 is to be determined in relation to one another in dependence on the particular application of the system SYS. Control of these temporal sequences can be performed by the processor unit CPU and/or the pressure sensors PS1, . . . , PS4.

The individual pressure measurements of the pressure sensors PS1, . . . , PS4 are preferably synchronized, i.e., performed isochronously, in order to provide, for each respective measurement instant, the current tire pressures of all tires R1, . . . , R4 that exist at that point. In particular cases, it may be necessary that the individual pressure measurements of the pressure sensors PS1, . . . , PS4 are not synchronized, i.e., performed at different instants or at different intervals of time. Each pressure sensor PS1, . . . , PS4 preferably measures the pressure of the corresponding tire continuously (in the case of analog pressure sensors) or at intervals of time which are as short as possible (in the case of digital pressure sensors). In this way, the tire pressure of the tires R1, . . . , R4 can be measured "gaplessly" during operation of the vehicle.

If such a gapless pressure measurement is not required and/or cannot be performed due to the quantity of data produced, the pressure measurement can also be performed at instants separated by longer intervals of time, during predetermined intervals of time and/or at predetermined instants during predetermined intervals of time.

Any application-specific temporal sequence of the pressure measurement by means of the pressure sensors PS1, . . . , PS4 can be selected, provided that it is assured that the pressure sensors PS1, . . . , PS4 measure the tire pressures at the instants/intervals of time at/in which a driving-dynamic state of the vehicle is to be recognized.

The pressure sensors PS1, . . . , PS4 generate output signals which correspond to the respectively measured pressure. These output signals of the pressure sensors PS1, . . . , PS4 are transmitted to the processor unit CPU. Depending on the pressure sensors used, the connection used between the pressure sensors PS1, . . . , PS4 and the processor unit CPU and/or the processor unit CPU used, these signals, indicating the respective tire pressure, can be analog or digital signals or can be converted from analog/digital signals to digital/analog signals upon their transmission to the processor unit CPU.

The processor unit CPU receives these signals of the pressure sensors PS1, . . . , PS4 for the purpose of determining/recognizing a driving-dynamic state of the vehicle on the basis of an analysis of these signals.

The tire loads of the individual tires R1, . . . , R4 vary in dependence on the respective driving-dynamic state of the vehicle (acceleration, retardation, cornering, travel on an irregular carriageway surface, . . . ). These load variations for the individual tires R1, . . . , R4 result in a variation of the tire circumferences. This means that, with an increase in the tire load, the tire circumference of the corresponding tire is reduced, whereas, with a reduction of the tire load, the tire circumference of the corresponding tire is increased. This circumferential variation results in a variation of the volume of the corresponding tire, causing the pressure in the corresponding tire to vary.

The driving-dynamic state of the vehicle is determined, using the processor unit CPU, on the basis of this relationship between driving-dynamic states of the vehicle and the tire pressures in the individual tires R1, ..., R4.

In order for a driving-dynamic state, particularly a critical driving-dynamic state of the vehicle to be recognized, it is necessary to measure tire pressures which serve as reference values.

Particularly suitable are reference pressures which are measured when the vehicle is in a stable driving state. For this, the tire pressure of each individual tire R1, ..., R4 is measured for a predetermined driving-dynamic state of the vehicle and/or on a carriageway with a predetermined surface. The predetermined driving-dynamic state of the vehicle preferably corresponds to straight forward travel at a constant speed. In addition, a carriageway with a regular, level carriageway surface is preferred for this.

It is also possible, however, for these reference pressures to be measured for each predetermined driving-dynamic state of the vehicle and/or any carriageway surface, provided that it is assured that the vehicle assumes the predetermined driving-dynamic state and the carriageway has the predetermined surface quality.

Once these reference pressures are available, comparisons of subsequently determined tire pressures of the tires R1, ..., R4 with the corresponding reference pressure in each case can be used to draw conclusions on the variation of the tire pressure for each tire R1, ..., R4. For the purpose of comprehensive recognition of a driving-dynamic state of the vehicle, isochronously measured tire pressure variations of all tires R1, ..., R4 are compared with each other.

If, for example, there is a drop in the tire pressure of the two tires on one side of the vehicle and an increase in the tire pressure of the two tires on the other side of the vehicle, it is concluded from this that the driving-dynamic state of the vehicle corresponds to cornering in the direction of the side of the vehicle with an increased tire pressure. The magnitude of the transverse acceleration of the vehicle can also be concluded from these tire pressure variations, since the tire circumferential variation resulting in the tire pressure variations is approximately 0.25 mm per degree.

If the tire pressure of the tires on the front axle increases and the tire pressure of the tires on the rear axle decreases, a driving-dynamic state of the vehicle exists which corresponds to a retardation (braking) of the vehicle. Conversely, an acceleration state of the vehicle exists if the tire pressure decreases on the front axle tires and increases on the rear axle tires. The magnitude of the retardation or acceleration of the vehicle can be determined from these pressure variations, since the tire circumferential variation resulting in the pressure variations is approximately 1.3 mm per 0.1 g.

For the purpose not only of recognizing a driving-dynamic state of the vehicle at an instant, but also enabling conclusions to be drawn on a temporal variation of the driving-dynamic state of the vehicle, a comparison of isochronously occurring pressure variations of the tires R1, ..., R4 is compared with at least one comparison for subsequent isochronously occurring pressure variations of the tires R1, ..., R4. In this way, it is possible to determine the sequence of successively occurring driving-dynamic states of the vehicle, rendering possible not only conclusions on desirable/undesirable variations of the driving-dynamic states of the vehicle, but also more precise conclusions on the respectively current driving-dynamic state that exists.

In addition to the recognition of driving-dynamic states of the vehicle, the system SYS also renders possible the recognition of a surface quality of the carriageway on which the vehicle is moving.

For this purpose, rather than the tire pressure variations of the individual tires R1, ..., R4, successively measured tire pressure variations of one tire R1, ..., R4 are compared with each other, at least two tire pressure variations of a tire measured in temporal succession being compared.

If, for example, the tire pressure of one or more tires varies with a high frequency, an undulating carriageway surface is concluded. The determined frequency of the tire pressure variation is a measure of the undulation of the surface quality, which can be calculated from the determined frequency. If such high-frequency tire pressure variations occur on one side of the vehicle only, while the tire pressure variations on the other side of the vehicle do not exhibit any high-frequency variations, it is concluded from this that one side of the vehicle is moving over an undulating carriageway surface while the other side of the vehicle is moving over a level carriageway surface.

If high-frequency tire pressure variations occur in the case of one tire only, it is concluded, for example, that the shock absorber for this tire is defective.

Once the processor CPU has performed the comparisons, described above, for recognizing a driving-dynamic state of the vehicle and/or a carriageway surface quality, the processor unit CPU outputs signals to the control unit CU. In response to these signals, the control unit CU controls the sensor control devices SC1, ..., SCn in such a way that the latter control components/devices of the vehicle, which are assigned to them and which serve to stabilize and/or control a driving-dynamic state of the vehicle, in such a way that the driving-dynamic state of the vehicle is stabilized or controlled if the currently existing driving-dynamic state of the vehicle is a critical or unwanted driving state.

The components/devices of the vehicle for stabilizing/controlling the driving state of the vehicle comprise components/devices for controlling the braking, the fuel supply, the engine rotational speed, the engine torque, etc.

As shown in FIG. 1, the processor unit CPU is connected to a memory unit MEM1. Instead of the external memory unit MEM1 shown here, it is also possible to use a memory unit which is integrated into the processor unit CPU. The memory unit MEM1 stores data which is accessed by the processor unit CPU or is transmitted by the latter to the memory unit MEM1.

The processor unit CPU is preferably designed as a programmable processor unit (e.g. microprocessor, computer system). The data which is used for programming the processor unit CPU and for controlling the entire system SYS by the processor unit CPU can be stored in, for example, a ROM memory of the processor unit CPU. It is advantageous, however, for this data to be stored in the memory unit MEM1 since, in this way, the programming and control data can be easily changed, for example, by replacing the memory unit MEM1 or by altering the data in the memory unit MEM1 by means of an external programming device. One type of processor unit CPU can thus be used for different applications, the programming and control data for the processor unit CPU being adapted to the specific application.

The memory unit MEM1 additionally stores data of the processor unit CPU which has been generated by the latter in response to received pressure signals of the pressure sensors PS1, ... PS4. Such data comprises reference tire pressure and tire pressure variation data. The processor unit CPU can access this data in the memory unit MEM1 during operation of the system SYS so that it can recognize driving-dynamic states of the vehicle. The data in the memory unit MEM1 can also be used by the processor unit CPU so that it can better recognize driving-dynamic states of the vehicle through a comparison of this data with data of currently existing tire pressures. It is possible in this case for the data generated by the processor unit CPU to be stored in its original form in the memory unit MEM1 or for the data generated by the processor unit CPU to be used for constructing a reference table, a neural network or a parameter set for fuzzy logic algorithms.

The memory unit MEM1 can furthermore contain data which is compared by the processor unit CPU with received tire pressure values for the purpose of more rapidly recognizing particular driving-dynamic states of the vehicle. These limiting values can, for example, define particularly critical driving-dynamic states of the vehicle which must be corrected particularly rapidly in order to bring the vehicle into a controllable, desired driving-dynamic state. The predefinition of corresponding limiting values in the form of data stored in the memory unit MEM1 reduces the computing requirement of the processor unit CPU in the case of such driving-dynamic states of the vehicle.

Figure 2:
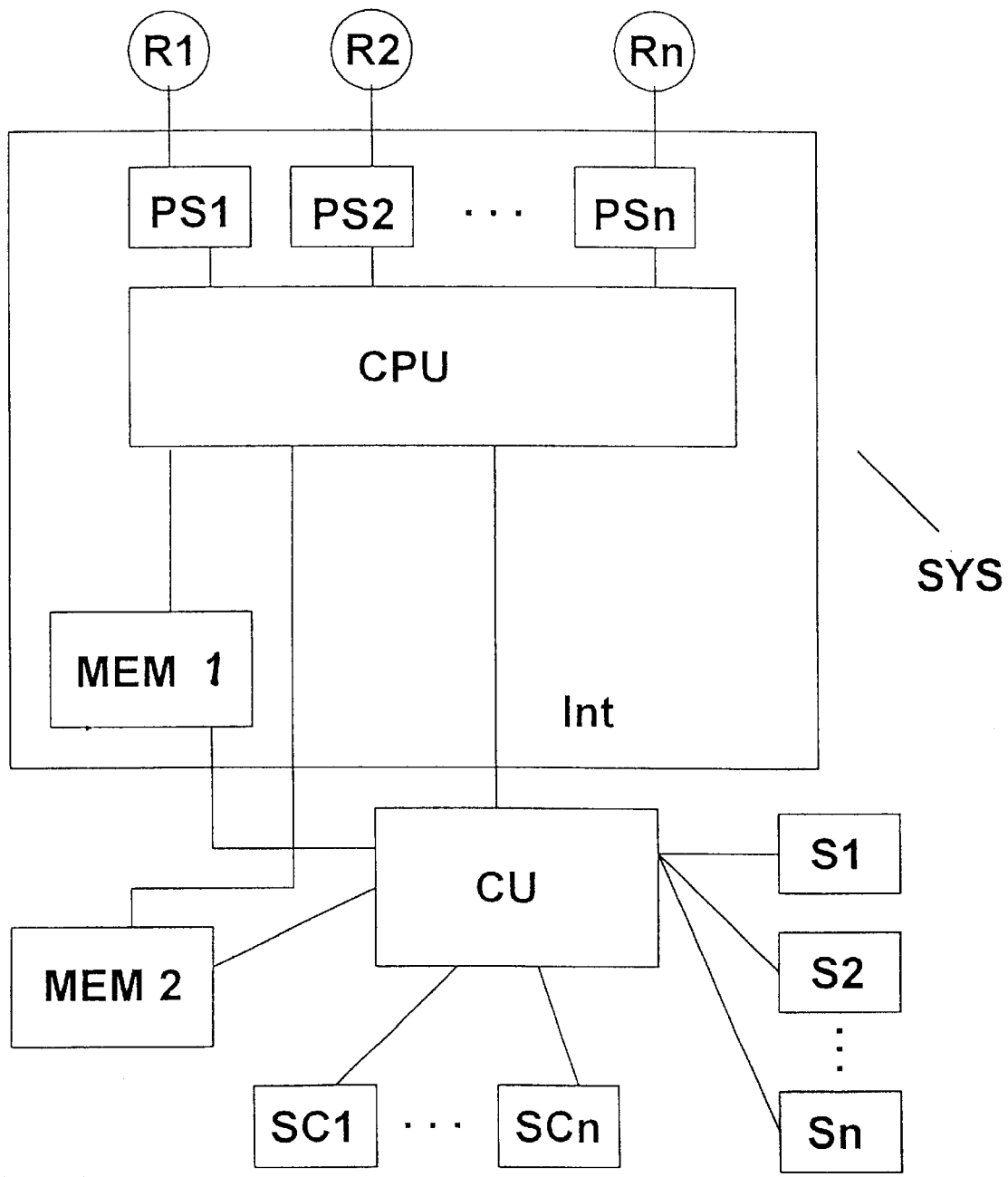
FIG. 2 shows an embodiment of the system according to the invention in combination with known devices for recognizing and stabilizing driving-dynamic states.

Whereas FIG. 1 shows an embodiment of the system SYS for recognizing driving-dynamic states of a vehicle in which the system SYS is mounted in the vehicle as a sole system for recognizing driving-dynamic states, FIG. 2 shows an embodiment of the system SYS which is used with other (known) vehicle stability controllers.

In the case of this embodiment, the control unit CU is connected to vehicle stability sensors S1, . . . , Sn. The vehicle stability sensors S1, . . . , Sn measure operating parameters of the vehicle such as, for example, the braking activity, the accelerator pedal position, the engine rotational speed, the engine torque, accelerations and/or retardations of the vehicle in the direction of travel and in directions across the direction of travel, the wheel rotational speed, the loading of the vehicle and the operation of additional devices of the vehicle (e.g. car telephone, car radio). In addition, vehicle stability sensors can be used which measure environmental parameters (temperature, weather conditions, . . . ), or even driver-specific parameters (breathing frequency, heart-rate, eye movements, body temperature, skin moisture, . . . ).

The vehicle stability sensors S1, . . . , Sn are components of known vehicle stability controllers such as, for example, ESP, ABS, ASR, MSR and devices for chassis damping. Such known vehicle stability controllers normally comprise a processor/control unit which measure and evaluate data of the corresponding vehicle stability sensors for the purpose of controlling corresponding vehicle stability controller devices for stabilizing and/or controlling the driving-dynamic state of the vehicle. In the case of the embodiment example shown here, the necessary processor/control units of such known vehicle stability controllers are integrated into the processor unit CPU and/or the control unit CU. The integration reduces the number of components required for recognizing driving-dynamic states of the vehicle, it being also possible—for example, in the case of a retrofit of the system SYS—to use known processor/control units and/or those already present in the vehicle in combination with the system SYS and, in particular, in combination with the processor unit CPU, additional connections (for example, CAN bus for data transmission) being required between the various units. As indicated in the case of the embodiment of FIG. 1, the vehicle stability controller devices comprise devices for controlling the brakes, the fuel supply, the engine rotational speed, the engine torque, etc.

The control unit CU is connected to a further memory unit MEM2, which is preferably also connected to the processor unit CPU. The control unit CU is additionally connected to the memory unit MEM1 for the purpose of accessing data supplied by the processor unit CPU. Like the memory device MEM1, the memory device MEM2 contains data for controlling the control unit CU and/or the processor unit CPU, as well as data supplied by the control unit CU and/or the processor unit CPU. Alternatively, the memory units MEM1 and MEM2 can be integrated into one memory unit, in order to reduce the number of components used.

The memory unit MEM2 also contains data which serves as limiting values, the processor unit CPU and/or the control unit CU being able to access data in the memory units MEM1 and MEM2.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Method for recognizing driving-dynamic states of a vehicle, with the following steps:
   isochronous measurement of respectively one reference pressure for each of at least two tires of the vehicle,
   isochronous measurement of respectively one current pressure for each of the at least two tires,
   comparison of the reference pressure of the at least two tires with, respectively, the corresponding current measured pressure, for the purpose of determining a variation of the pressure for each of the at least two tires,
   comparison of the pressure variations of the at least two tires, and
   evaluation of the determined pressure variations of the at least two tires and of the comparison of the same, for the purpose of generating driving state information which indicates the driving-dynamic state of the vehicle.

2. Method according to claim 1, characterized in that the reference pressures of the at least two tires are at least one of measured for a predefined driving-dynamic state of the vehicle and measured on a carriageway with a predefined surface quality.

3. Method according to claim 1, characterized in that the isochronous measurement of the current pressure for the at least two tires is performed
   continuously,
   repeatedly at predetermined instants,
   continuously for a predetermined interval of time, and
   repeatedly at predetermined instants for a predetermined interval of time.

4. Method according to claim 3, characterized in that at least one of the predetermined instants and the intervals of time are varied in dependence on driving-dynamic states of the vehicle.

5. Method according to claim 3, characterized by
   comparison of at least two pressure variations, occurring in temporal succession, of at least one of the at least two tires, for the purpose of determining a temporal course of the pressure variations of the tire.

6. Method according to claim 5, characterized by
   comparison of the pressure variations of the at least two tires for at least two pressure variations occurring in temporal succession, for the purpose of determining a temporal course of the pressure variations of the at least two tires.

7. Method according to claim 6, characterized by evaluation of the temporal course of the pressure variations for at least one of the at least two tires.

8. Method according to claim 3, characterized by evaluation of at least two comparisons of the isochronously occurring pressure variations of the at least two tires for temporally successive instants at which isochronously occurring pressure variations were measured.

9. Method according to claim 6, characterized by evaluation of the temporal course of the pressure variations of the at least two tires.

10. Method according to claim 7, characterized in that the driving state information is generated on the basis of at least one of the evaluation of the temporal course of the pressure variations for at least one of the at least two tires, an evaluation of at least two comparisons of the isochronously occurring pressure variations of the at least two tires for temporally successive instants at which isochronously occurring pressure variations were measured, and an evaluation of the temporal course of the pressure variations of the at least two tires.

11. Method according to claim 5, characterized by evaluation of the comparison of the temporal course of the pressure variations for at least one of the at least two tires, for the purpose of generating carriageway information which indicates the surface quality of the carriageway.

12. Method according to claim 11, characterized by evaluation of the comparison of the temporal course of the pressure variations of the at least two tires, for the purpose of generating the carriageway information.

13. Method according to claim 11, characterized in that at least one of the driving state information and the carriageway information is used for controlling devices of the vehicle which at least one of stabilize and control the driving state of the vehicle.

14. Method according to claim 11, characterized in that further sensors for recognizing driving-dynamic states of the vehicle are controlled by use of at least one of the driving state information and the carriageway information.

15. Method according to claim 8, characterized in that the driving state information is generated on the basis of at least one of an evaluation of the temporal course of the pressure variations for at least one of the at least two tires, the evaluation of at least two comparisons of the isochronously occurring pressure variations of the at least two tires for temporally successive instants at which isochronously occurring pressure variations were measured, and an evaluation of the temporal course of the pressure variations of the at least two tires.

16. Method according to claim 9, characterized in that the driving state information is generated on the basis of at least one of an evaluation of the temporal course of the pressure variations for at least one of the at least two tires, an evaluation of at least two comparisons of the isochronously occurring pressure variations of the at least two tires for temporally successive instants at which isochronously occurring pressure variations were measured, and the evaluation of the temporal course of the pressure variations of the at least two tires.

17. System for recognizing driving-dynamic states of a vehicle, comprising:

pressure sensors which are respectively arranged for the purpose of measuring tire pressures of at least two tires of the vehicle, and a processor unit which is connected to the pressure sensors and receives and evaluates signals from the pressure sensors which respectively indicate the pressures measured by the corresponding pressure sensor, characterized in that driving state signals generated by the processor unit on the basis of the signals of the pressure sensors indicate a driving-dynamic state of the vehicle.

18. System according to claim 17, characterized by carriageway signals generated by the processor unit which, on the basis of the signals of the pressure sensors, indicate a surface quality of the carriageway on which the vehicle is moving.

19. System according to claim 17, characterized by at least one driving stability controller, connected to the processor unit, for at least one of stabilizing and monitoring the driving-dynamic state of the vehicle on the basis of the signals generated by the processor unit.

20. System according to claim 19, characterized in that a control unit is connected between the processor unit and the at least one driving stability controller, and at least one driving state sensor is connected to the control unit.

21. System according to claim 20, characterized by signals, generated by the control unit, for the at least one driving stability controller which are based on at least one of the driving state signals and signals from the at least one driving state sensor.

22. System according to claim 20, characterized in that the processor unit is connected to the at least one driving state sensor in order to obtain signals from the at least one driving state sensor for the purpose of generating at least one of the driving state signals and the carriageway signals.

23. System according to claim 17, characterized by at least one driving stability controller, connected to the processor unit, for at least one of stabilizing and controlling the driving-dynamic state of the vehicle on the basis of the signals generated by the processor unit.

* * * * *